May 25, 1965 T. H. KRUEGER 3,185,363
MANUAL STRAPPING TOOL FOR PRESSURE SENSITIVE TAPE
Filed Sept. 26, 1961 3 Sheets-Sheet 1

INVENTOR.
Theodore H. Krueger
BY Moses, Nolte & Nolte.
ATTORNEYS.

May 25, 1965     T. H. KRUEGER     3,185,363
MANUAL STRAPPING TOOL FOR PRESSURE SENSITIVE TAPE
Filed Sept. 26, 1961     3 Sheets-Sheet 2
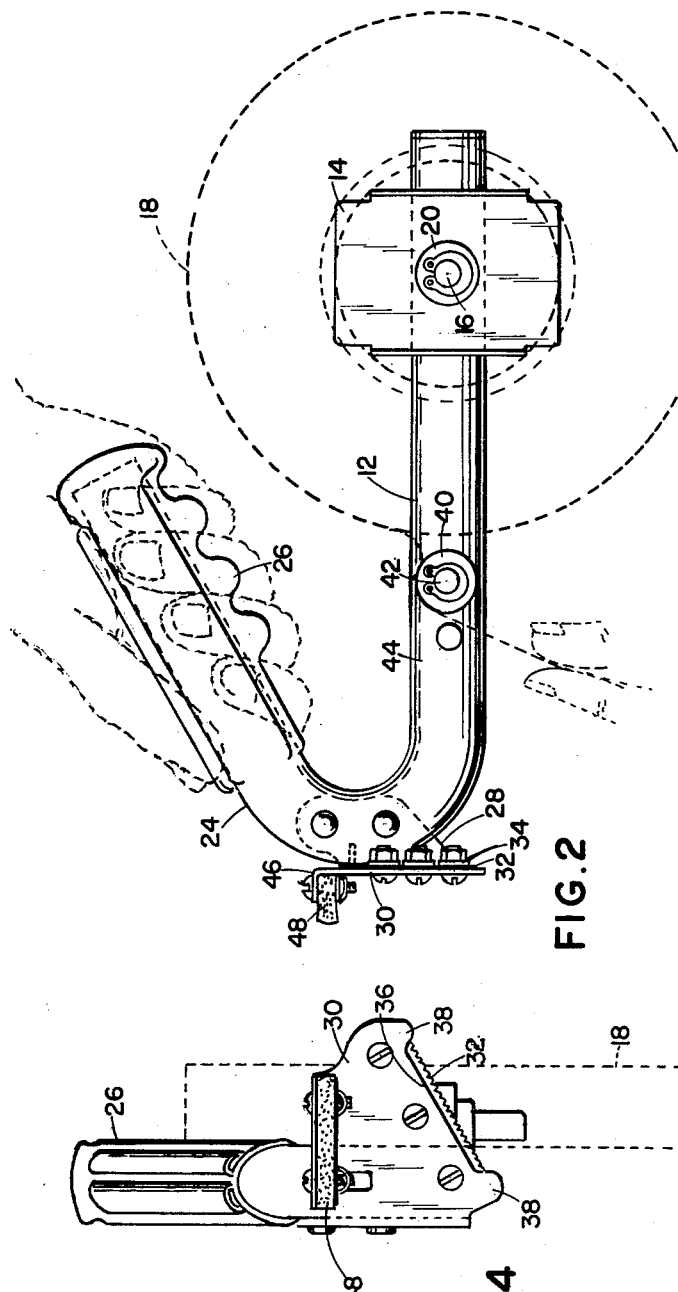
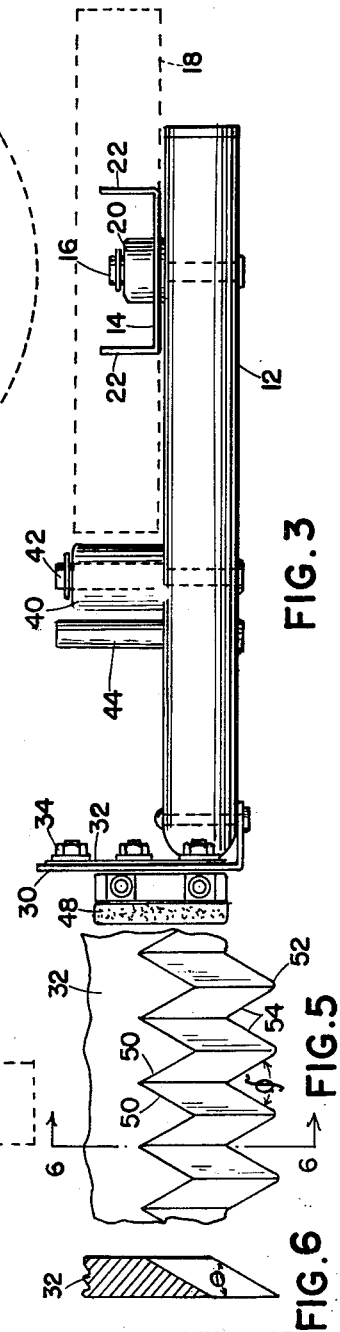
*INVENTOR.*
Theodore H. Krueger
BY *Moses, Nolte & Nolte*
ATTORNEYS.

May 25, 1965 T. H. KRUEGER 3,185,363
MANUAL STRAPPING TOOL FOR PRESSURE SENSITIVE TAPE
Filed Sept. 26, 1961 3 Sheets-Sheet 3
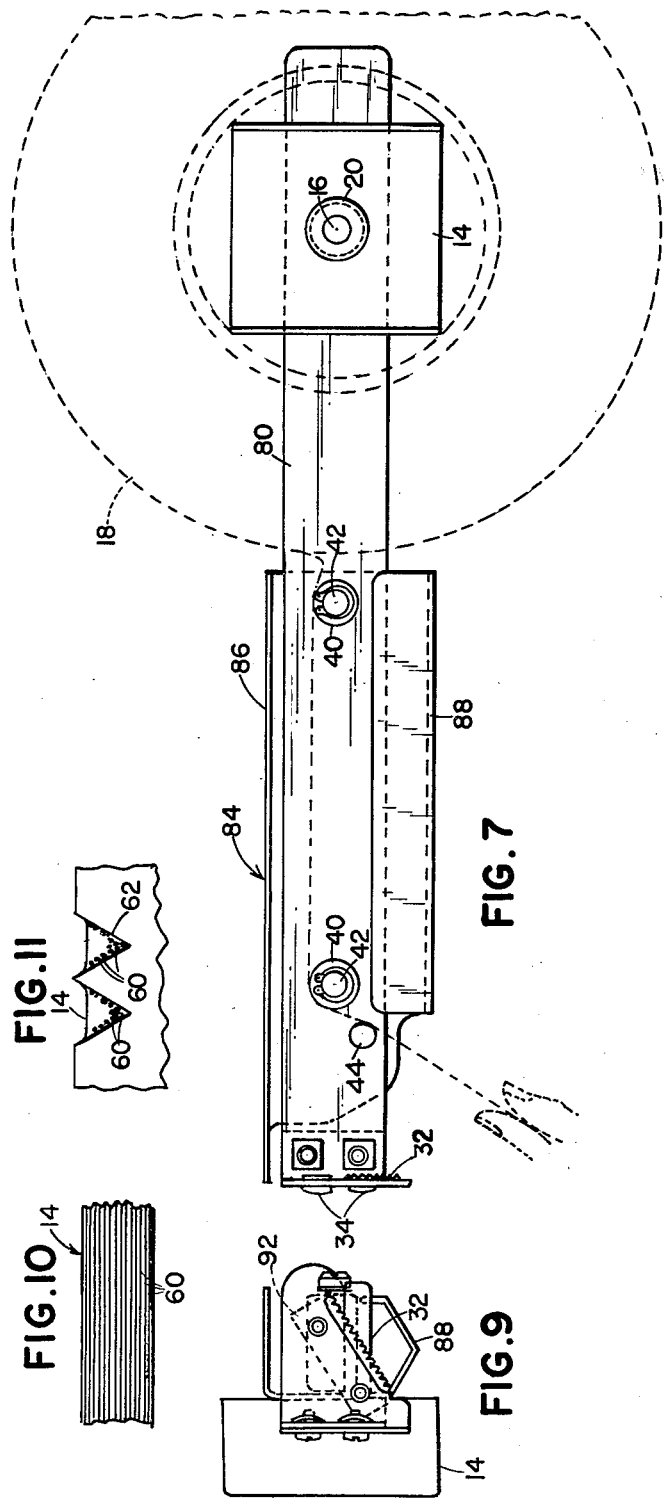
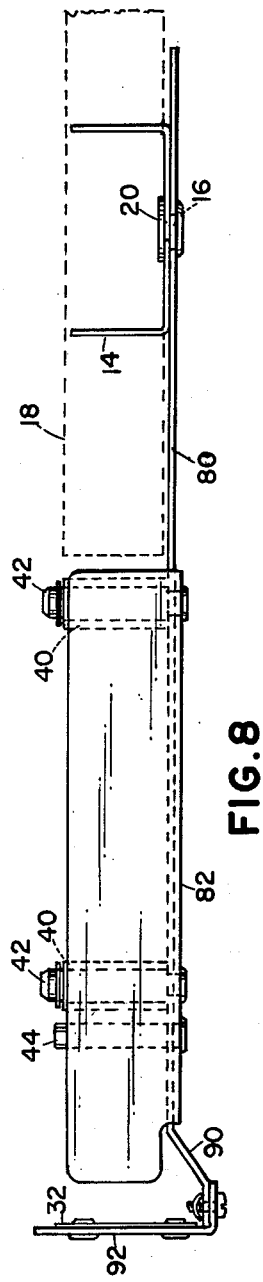
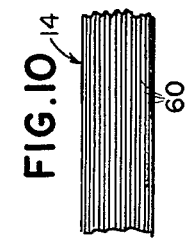
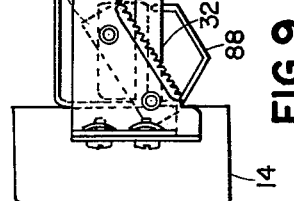
INVENTOR.
Theodore H. Krueger
BY Moses, Nolte & Nolte
ATTORNEYS.

3,185,363
MANUAL STRAPPING TOOL FOR PRESSURE
SENSITIVE TAPE
Theodore H. Krueger, Stratford, Conn., assignor to Better Packages, Inc., a corporation of Delaware
Filed Sept. 26, 1961, Ser. No. 140,917
2 Claims. (Cl. 225—66)

This invention relates to strapping tools particularly applicable to the binding of boxes, bundles, etc. with adhesive tapes, especially pressure-sensitive adhesive tapes. Adhesive strapping tapes are now available which are made of paper or plastics reinforced longitudinally with filaments of high tensile strength, such as nylon threads or glass filaments. Such tapes are very strong and are frequently used in place of steel or wire straps. Such reinforced tapes, while very strong, are also difficult to cut or tear as must be done when the tapes are dispensed from a roll.

Most dispensers for tapes of this type have been provided with a scissor type cutter. Such scissor type cutters, however, are more or less complicated and expensive and are awkward to operate when used on portable manual dispensers. Attempts have also been made to use razor edged cutters, but these are dangerous. Common serrated blades punched or blanked from thin sheet steel have also been employed. These, however, are not effective for the severing of the strongly reinforced plastic or paper tapes.

In accordance with the present invention a new type of serrated blade is provided in which a multiplicity of small saw-like teeth are formed at an angle to the face of the blade as by broaching, milling or grinding. This provides sharp, inclined edges which do the cutting while the extreme points of the blade are left relatively dull or smoothed off. This provides a blade which, while effective for its intended purpose, is quite safe, as the closely spaced dull or smooth and rounded points will not in ordinary use cut the operator's finger even if accidentally moved longitudinally of the blade.

The manual strapping tools of the present invention also involve novel constructions by which they may be gripped and manipulated, improved formations for holding a blade in proper place, for carrying a supply roll of tape, for guiding the tape from the supply roll to position for application to the box or package, and for supporting the tape so that it may be properly tensioned and severed by the cutter. After severing the tape end projecting from the tool is deflected to position where it can be grasped and pulled by the user for the next application without his fingers coming into contact with the blade. The devices may also be provided with a rub-down member by which the end of the tape may be rubbed down upon the box during application.

It is an object of my invention to provide an improved tool for applying tape to boxes or packages comprising some or all of the above features.

It is a further object of the invention to provide a cut-off or tear-off blade of improved construction particularly adapted for the severing of reinforced tapes.

Other objects and advantages of the invention will appear in the course of the description of two embodiments of the invention chosen to illustrate the principles thereof.

In the accompanying drawings:

FIG. 2 is a side elevation of the strapping tool shown in FIG. 1;

FIG. 3 is a plan view of the tool of FIG. 2;

FIG. 4 is an end view looking at the tool from the left hand end as shown in FIG. 2;

FIG. 5 is a side view on a much enlarged scale of a part of an improved cutter or blade;

FIG. 6 is a section on line 6—6 of FIG. 5;

FIG. 7 is a side elevation of a modified form of strapping tool;

FIGS. 8 and 9 are plan and end views, respectively, of the tool shown in FIG. 7;

FIG. 10 is a plan view of a fragment of reinforced tape, and

FIG. 11 is a diagrammatic view showing the action of reinforced tape when drawn across a cutter having one or more large V-shaped edge formations as distinguished from the numerous small sharp edged formations of the present invention.

Figure 1:
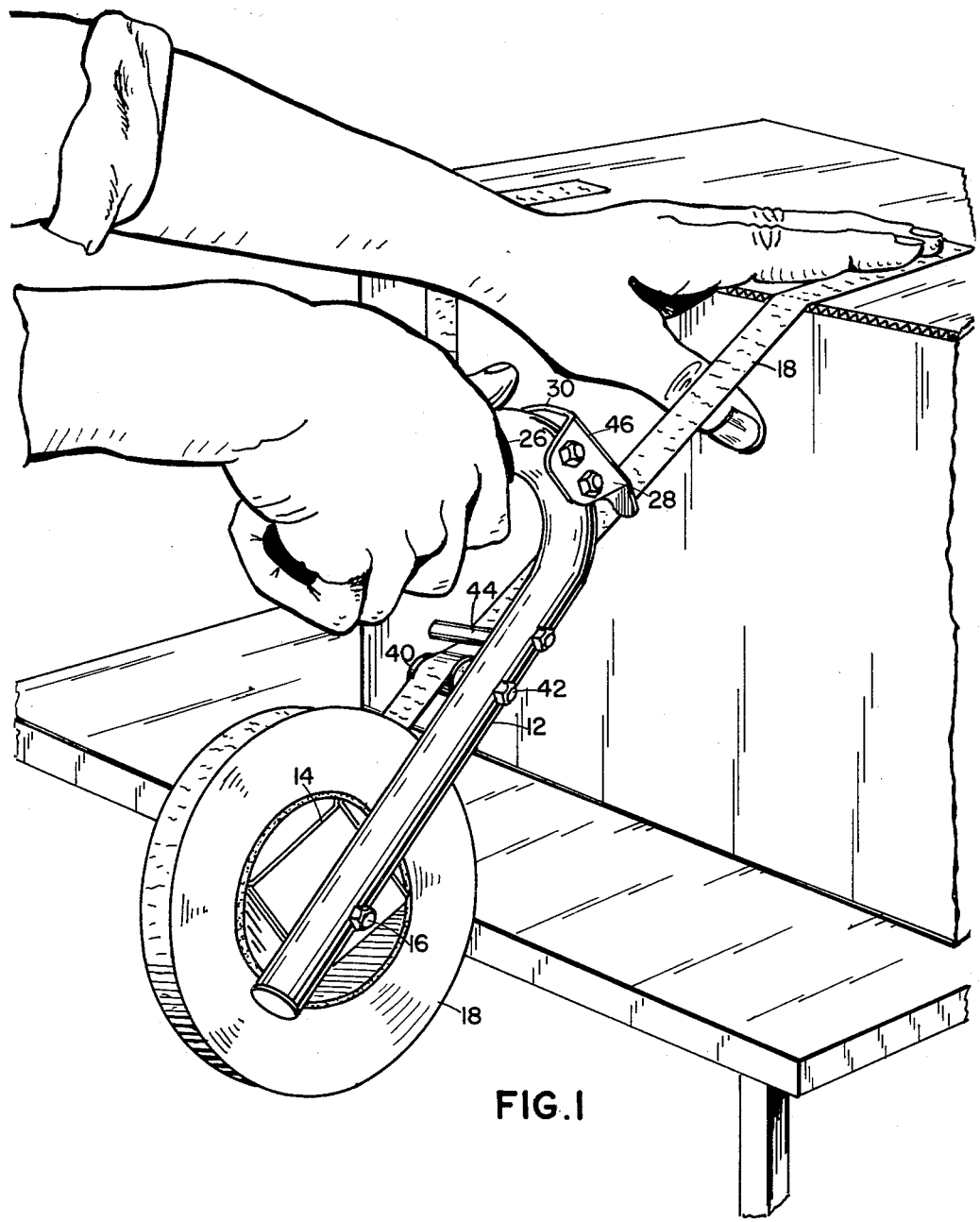
FIG. 1 is a perspective view illustrating one embodiment of the invention in use.

Referring to the drawings in detail, the tool shown in FIGURES 1 to 6 comprises a frame member 12 to which is attached a reel 14 mounted to rotate freely upon a stud 16. Reel 14 may be of any suitable form adapted to hold a roll of tape indicated in dotted lines at 18. As shown, the reel consists merely of a plate fixed to a hub 20 and having bent up flanges 22 over which the central core of the roll fits. The frame member 12 preferably is bent into a reverse curve so as to provide a handle portion 24 which may be provided with a molded and shaped hand grip 26 of plastic, rubber or the like. The frame member 12 and handle portion may be formed of aluminum tubing or other suitable material. Fixed at or near the curve of the frame member is a bracket 28 having a plate portion at right angles to the frame member and which constitutes a carrier for a blade 32 attached thereto in any suitable manner as by bolts 34. The plate member 30 is preferably formed to provide an inclined edge 36, beyond which the edge of the blade projects slightly, and rounded end lugs 38 which project beyond the edge of the blade so as to protect the corners of the blade and to prevent contact of the operator's fingers therewith. The blade is preferably set at a substantial angle to the frame member 12. Such angle may vary considerably, preferably between 30° and 75° to the plane of the surface of the tape coming from the tape roll, when reinforced tape is to be dispensed. When the tool is used for dispensing unreinforced masking tapes or cellophane tapes, the angle of the blade can be much less or even zero.

The frame of the device is preferably provided with one or more adhesion rollers and guide pins for guiding the tape from the roll when the tool is being used to apply the tape to the article being sealed, as shown, for example, in FIG. 1. In the construction illustrated, a single adhesion roller 40 is provided which is rotatably mounted upon a stud 42 fixed in the frame. The adhesive face of the tape is led from the tape roll over this adhesion roller to which it remains adhered so that, when the tape is cut off, the end of the tape coming from the roll will be held in a position for ready application to the next box. In the tool shown, the frame also carries a fixed guide pin 44 which engages only the non-adhesive side of the tape and provides a convenient means for pressing down on the tape and stretching the tape between the point where it leaves the box and the guide pin so that it may be more easily severed by the cutting blade. The guide pin 44 is so placed as to deflect the end of the tape coming from the adhesion roller at an angle to the body of the tool so that it lies somewhere between the parallelism with the plane of the cutting knife, and an angle preferably not less than 45 degrees thereto.

Reinforced tape of the character usually employed with the present tool is quite stiff and will project in a more or less straight line in the direction in which it is deflected. Owing to these factors, the end of the tape will project in a direction where it may be readily grasped without necessity of placing the fingers close to the knife. The deflected direction of the tape is also at a sharp angle to the axis of the tool frame so that when a preliminary feed of the tape is desired, as is often necessary before a "baling job," as when winding the tape around a bundle of tubes or several boxes, or if the tool is used as a dispenser rather than as an applicator, the tape may be pulled in a transverse direction away from the other hand which is holding the tool. This permits the easy and effective application of the pulling force and does not require the hand to be brought into dangerous proximity to the blade. This is a major advantage of the construction described.

The tool may also be provided with a wiping or pressing member which may be used to wipe down the end of the tape upon the box or package after the tape has been severed. As shown, the end of the plate 30 is bent into a bracket 46 which carries a pressing pad 48 preferably of felt or other flexible material.

While any operative form of cutting blade may be employed, a greatly improved form is illustrated, particularly in FIGS. 5 and 6. As here shown, it will be seen that a multiplicity of teeth are formed by grinding, milling or broaching the edge of blade 32 at an acute angle to the plane of the blade surface, which angle is preferably less than 45°, an angle of 30° more or less being illustrated. This angle is marked $\theta$, in FIGURE 6. The side faces 50 of the teeth, as shown in FIG. 5, are preferably at an acute angle $\phi$, which may be 90° or less, as for example 60° more or less, as illustrated. The points of the teeth are preferably dulled or rounded, as indicated at 52. The diagonal edges 54, however, are sharp and do the actual cutting of the reinforcing fibers of the tape. The exposed edge of the blade, however, which may be contacted accidentally by the fingers of the operator, is composed of the closely spaced, rounded points 52, which in ordinary use will not puncture the skin or cause cuts even if the finger is accidentally moved lengthwise of the blade. When the tape is drawn down over the blade, the points 52 are sufficiently sharp to penetrate the paper or plastic of the tape between the reinforcing fibers, which are then severed by the sharp inclined edge portions 54.

A plan view of a piece of tape is shown in FIGURE 10, the reinforcing fibers such as nylon thread or glass fibers being indicated at 60. In accordance with the present invention, a multiplicity of very small teeth are provided, spaced for instance at around 50 to the inch, the teeth being sufficiently small and closely spaced as to enter between every pair of reinforcing fibers, or at most sufficiently closely to receive only two or three fibers which may easily be severed by the sharp edges 54. The use of a cutter formed as a single V, or with a few wide V's, will not function satisfactorily because when the tape is pulled against such a cutter, a large group of fibers will be deflected to the bottom of the V, as indicated in FIGURE 11 at 62, thereby forming in effect a bunch or rope of fibers which can not be readily cut but can only be pulled apart by exerting a very substantial force, which will result in a rough tear or prevent effective cutting of the tape altogether.

The form of cutter described is particularly useful on a portable or hand tool where it is essential that a type of blade which will not be dangerous to the operator be used; also one which cuts easily, because it would be inconvenient to exert substantial force while manipulating the tool with one hand and holding the box or package with the other. The mounting and manipulation of a scissor type cutter on a hand tool of the present character also presents mechanical and operative difficulties.

A modified form of strapping tool is shown in FIGS. 7, 8 and 9. In this construction the tape reel 14 is mounted on a metal bar 80 fixed to the sidewall 82 of a tubular channel shaped member 84 which is formed of the side wall 82, a top wall 86 and a bottom 88 which may be bent up into a sort of V shape so that the member 84 forms a hollow member with an open side which may be grasped in the hand when manipulating the tool. The open side permits the tape from the roll to be readily threaded through the channel or hand grip member. Mounted on the back of the channel and projecting into the same are a pair of adhesion rollers 40 mounted on studs 42. The opposite end of the bar 80 from that carrying the tape reel projects beyond the channel 84 and is preferably offset, as shown at 90 in FIGURE 8. Attached to this offset portion is a blade plate 92, similar to the blade plate 30 shown in FIGURE 4, and to which the blade 32 is bolted by bolts 34. Attached to the back of the channel is a deflector pin 44 under which the tape is passed, this pin being engaged by the non-adhesive side of the tape and serving to deflect the tape away from the cutter after it has been severed, and also deflect the tape outward so that it may be readily grasped by the fingers when starting another operation. Sufficient space is left between the lower side of the channel, the pin and the cutter to enable this to be done. The pin also serves as an abutment to draw the tape against when tensioning the same as the cutter is pressed against the tape to sever it. The operation of this form of the invention is similar to that shown in the previous figures. A wiper or presser pad 48 may also be provided on this form of tool if desired.

I have described what I believe to be the best embodiments of my invention. I do not wish, however, to be confined to the specific examples shown but I desire to cover by Letters Patent all structures embodying the principles of the invention as generally set forth or intended to be set forth in the appended claims.

I claim:

1. A manual strapping tool comprising a portable frame having a shaft portion and a hand grip portion extending at an angle from the shaft portion, means for mounting a tape roll on said shaft portion near the end thereof remote from the hand grip portion, at least one adhesion roller rotatably mounted on an intermediate portion of said shaft portion at a point removed from the junction of said hand grip portion therewith over which tape from the tape roll may be led with the adhesive side of the tape engaging said adhesion roller, a deflecting member for engagement with the non-adhesive side of the tape after it leaves said adhesion roller for deflecting the tape laterally of the tool frame, and a tear off tape cutter mounted on said frame adjacent the junction of said shaft portion and said handle portion and between said portions and having a cutting edge projecting beyond said junction in position to sever tape passing from said deflecting member to the article to which the tape is to be applied.

2. A hand carried tape dispensing and severing tool comprising a tubular frame having a substantially straight portion and a handle portion curved outwardly at an acute angle therefrom, an adhesive tape roll rotatably mounted adjacent the end of said straight portion remote from that from which the handle portion extends, an adhesion roller rotatably mounted adjacent said tape roll in a position to receive the adhesive surface of the tape from the tape roll, a deflecting roller extending outwardly from said frame straight portion at a location spaced in the direction of said handle portion from said adhesion roller, a knife member mounted on said frame at the juncture of said curved handle portion with said straight portion and including a cutting edge portion sharply inclined transversely with respect to the plane of the tape.

References Cited by the Examiner

UNITED STATES PATENTS

| | | | |
|---|---|---|---|
| 991,738 | 5/11 | Morris | 225—80 X |
| 1,708,725 | 4/29 | Huempfner | 225—80 X |
| 2,331,791 | 10/43 | Noel | 225—91 X |
| 2,607,508 | 8/52 | Clampitt | 156—527 |
| 2,777,594 | 1/57 | Krueger | 156—527 |
| 3,051,223 | 8/62 | Waltz | 156—527 |

FOREIGN PATENTS 339,829 9/59 Switzerland.

ANDREW R. JUHASZ, *Primary Examiner.*

LAVERNE D. GEIGER, *Examiner.*